(12) United States Patent
Gujar et al.

(10) Patent No.: US 6,498,601 B1
(45) Date of Patent: *Dec. 24, 2002

(54) METHOD AND APPARATUS FOR SELECTING INPUT MODES ON A PALMTOP COMPUTER

(75) Inventors: Anuj Uday Gujar, Mountain View, CA (US); David Goldberg, Palo Alto, CA (US); Kenneth P. Fishkin, Redwood City, CA (US); Beverly L. Harrison, Palo Alto, CA (US); Roy Want, Los Altos, CA (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/450,238

(22) Filed: Nov. 29, 1999

(51) Int. Cl.[7] ................................. G09G 5/00
(52) U.S. Cl. ................... 345/173; 178/18.03; 178/18.1; 345/179
(58) Field of Search ................. 345/173, 174, 345/175, 176, 177, 178, 179, 168, 169; 178/18.01, 18.1, 19.01, 18.03

(56) References Cited

U.S. PATENT DOCUMENTS 5,365,461 A * 11/1994 Stein et al. ................. 345/179
5,596,654 A  1/1997 Tanaka ....................... 382/168
5,596,656 A  1/1997 Goldberg .................... 382/186
5,889,888 A  3/1999 Marianetti et al. .......... 382/187
5,900,875 A  5/1999 Haitani et al. .............. 345/349
6,160,555 A * 12/2000 Kang et al. ................. 345/358
6,262,717 B1 * 7/2001 Donohue et al. ............ 345/173
6,297,795 B1 * 10/2001 Kato et al. .................. 345/169
2001/0035854 A1  11/2001 Rosenberg et al.

FOREIGN PATENT DOCUMENTS

| EP | 0 911 720 A1 | 4/1999 | G06F/3/033 |
| GB | 2 234 102 A | 1/1991 | G06K/9/62 |
| WO | WO 97/18456 | 5/1997 | G09G/3/02 |

* cited by examiner

*Primary Examiner*—Xiao Wu
(74) *Attorney, Agent, or Firm*—Fliesler Dubb Meyer & Lovejoy LLP

(57) ABSTRACT

A palmtop computer for entering characters using one or more input modes. In one example, a physical sensor is coupled to select the input mode. The physical sensor may be in the form of a button, rocker switch, dial, pressure strip, moveable bar, or accelerometer mounted to the device. The physical sensor may also be mounted to a pen. In another example, a ridge is formed on the digitizer pad and positioned to define input regions associated with particular input mode. In another example, a border is formed around the digitizer pad. The border includes a ridge coupled to select the input mode. The digitizer pad may also be textured. A first textured region is associated with one input mode and a second textured region is associated with another input mode.

11 Claims, 10 Drawing Sheets

METHOD AND APPARATUS FOR SELECTING INPUT MODES ON A PALMTOP COMPUTER

TECHNICAL FIELD

The present invention relates to the field of palmtop computers. More particularly, the present invention relates to the selection of input modes for entering alpha-numeric characters on palmtop computers.

BACKGROUND

The palmtop computer has evolved as a portable device which provides for easy storage, organization, and recollection of information. Palmtop computers are small, compact computers that generally fit in the palm of a person's hand. The palmtop computer allows for easy operation, as a user simply holds the palmtop computer in one hand (the "writing hand") while entering information with the other hand (the "non-writing hand"). Because of the small size of the palmtop computer, the user may simply place the device in a pocket or briefcase when not in use.

When the user wishes to enter information, it is desirable to record the information promptly and accurately. Otherwise, a broad range of problems might occur when the user needs to recall the information. A busy professional might miss an important deadline or meeting. A grocery shopper might buy only a portion of the items needed to prepare a meal.

Conventional palmtop computers generally employ a digitizer pad upon which a user may write with a pen or finger. A handwriting recognition system is generally incorporated to recognize strokes and presses made by the user upon the digitizer pad as individual characters. The handwritten characters are then converted into a machine-readable format such as ASCII code.

One problem associated with conventional palmtop computers has been the poor performance of handwriting recognition systems. Characters input by the user are often improperly identified. For example, a user may attempt to write the number "1," but the letter "1" is recognized. Similar, the letter "s" may be confused for the number "5." When the user recalls what was entered, the palmtop computer returns the erroneous information. The user must then waste time and energy in attempting to ascertain what he originally wrote.

Techniques have been developed to differentiate between characters written on the digitizer pad. One way has been to provide for different "modes" of input. In one embodiment, one mode allows for only lowercase letters to be input ("alpha mode"), a second mode is for only uppercase letters ("caps mode"), a third mode is for numbers ("numeric mode"), and a fourth mode is for punctuation ("punctuation mode"). When input modes are used, the number of possible characters which may be confused for a particular stroke is greatly reduced. For example, if alpha mode is selected, the recognition system will not recognize the letter "s" as the number "5." Similarly, a lowercase "c" will not be recognized as an uppercase "C."

Selecting and switching among various input modes using conventional means takes time and effort on the part of the user. The user must take some action to switch from one mode to another, in addition to the strokes and motions he would otherwise have to make to input the actual characters. For example, some conventional schemes involve the use of "mode change" strokes which the user makes on the digitizer pad to change input modes. These mode change strokes must be interspersed with strokes the user ordinarily would make to enter characters. Such systems present various problems. Additional time is required to make the mode change strokes. The mode change strokes themselves are often confused for input characters. Also, it is often not immediately clear to the user which input mode is being used. The particular mode may be displayed on a display area of the digitizer pad, but the user must still look at the device to determine which mode is active.

Thus, conventional methods for input mode selection introduce such discontinuities into the input activity that the quality of interaction is reduced. Users often compromise what is inputted for the ease of inputting it. For example, users may choose not to take the time to capitalize or punctuate when they enter notes because of the time and effort required to change modes. While such informal data entry may be acceptable for personal notes, it may not be acceptable if the user is creating or editing a document that is to be distributed to others.

SUMMARY

The present invention relates to a palmtop computer. Characters may be entered using one or more input modes. The computer includes a casing and a digitizer pad coupled to the casing.

According to one aspect of the present invention, the computer includes a physical sensor coupled to select an input mode.

According to another aspect of the present invention, a ridge is formed on the digitizer pad. The ridge is positioned on the pad to define a first input region associated with one input mode and a second input region associated with another input mode.

According to yet another aspect of the present invention, a border is formed around the digitizer pad. The border includes a ridge coupled to select an input mode.

According to yet another aspect of the present invention, the digitizer pad has a first textured region associated with one input mode and a second textured region associated with another input mode.

According to yet another aspect of the present invention, a pen is incorporated. A physical sensor is mounted to the pen and coupled to select an input mode.

BRIEF DESCRIPTION

Figure 2A:
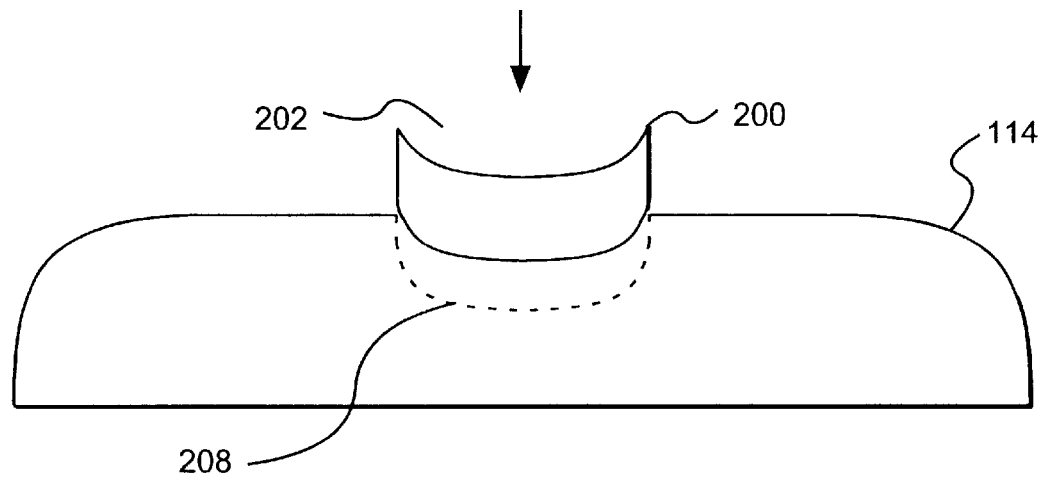
Figure 2B:
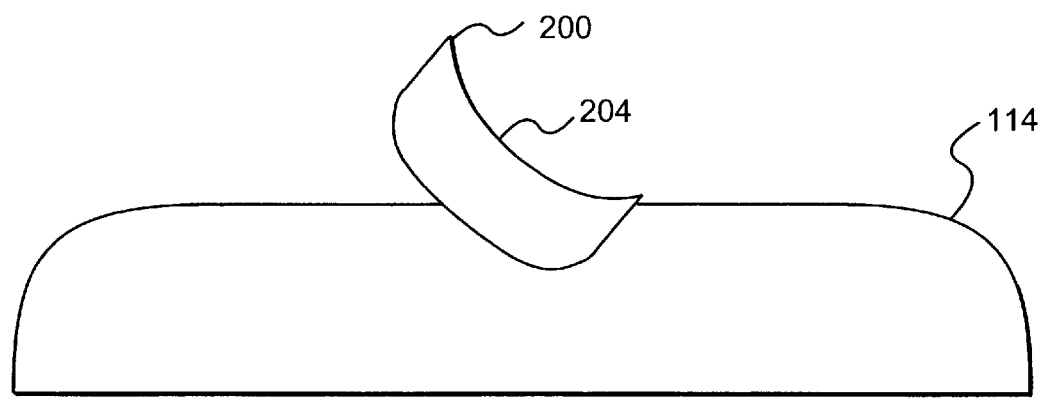
Figure 2C:
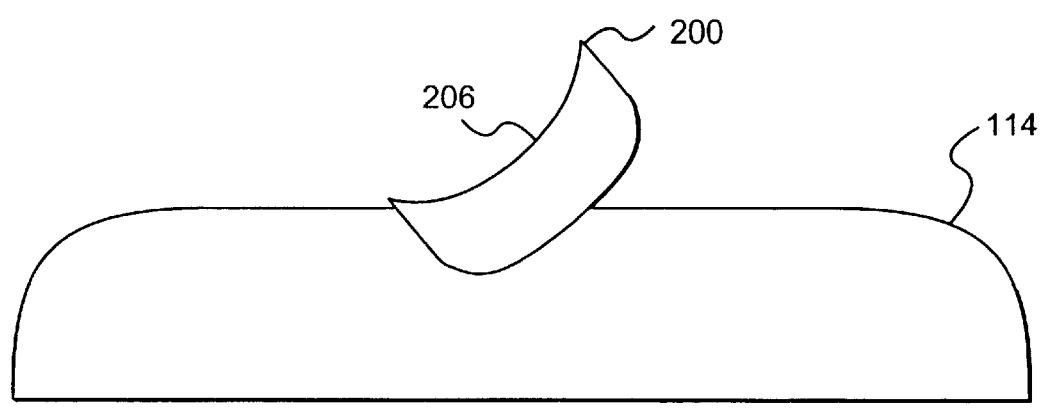

FIGS. 2a, 2b and 2c are side views of a rocker switch 200, mounted to palmtop computer 100, constructed according to an exemplary embodiment of the present invention.

Figure 3:
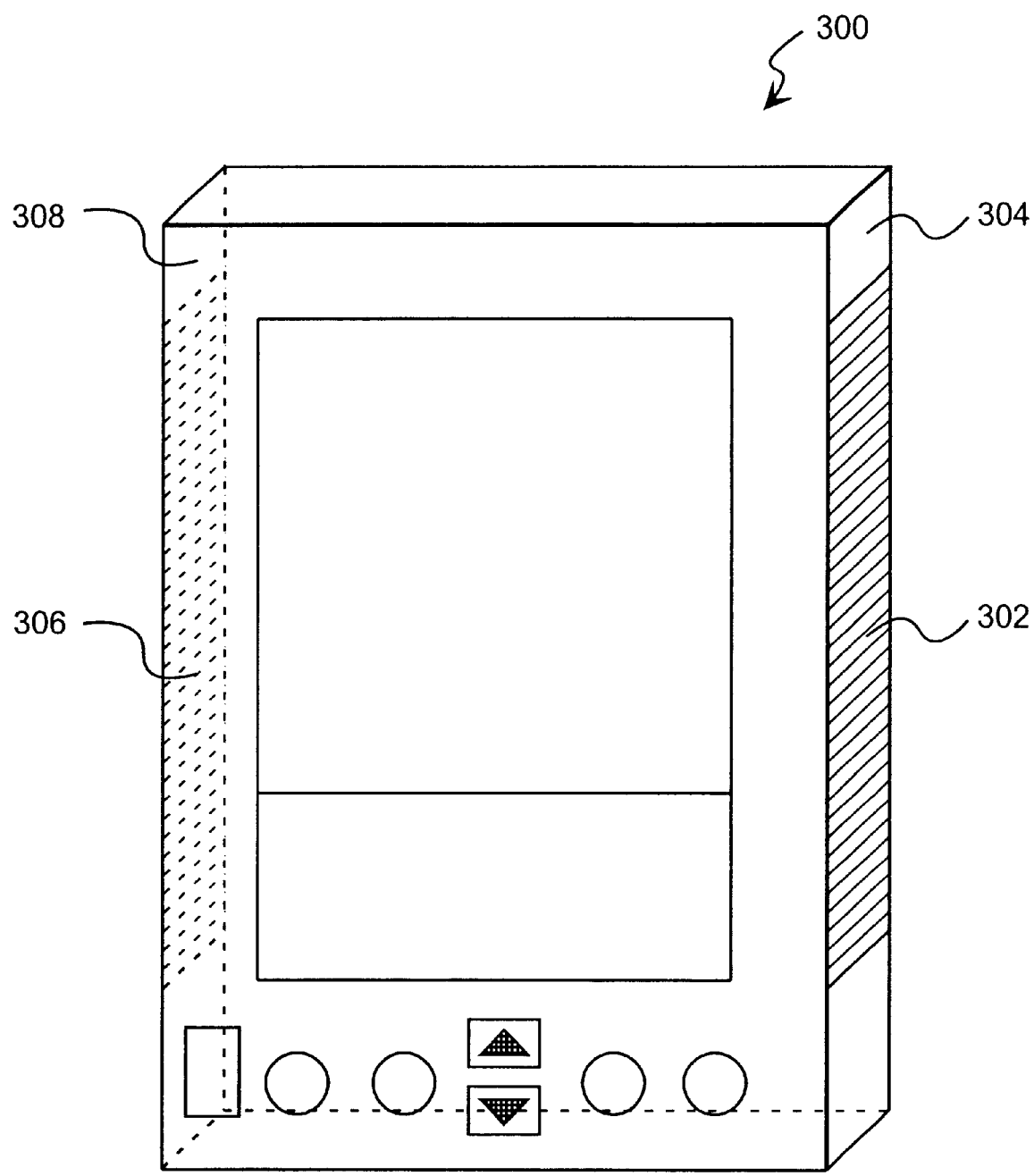

FIG. 3 is a front view of a palmtop computer 300 incorporating pressure strips constructed according to an exemplary embodiment of the present invention.

Figure 4:
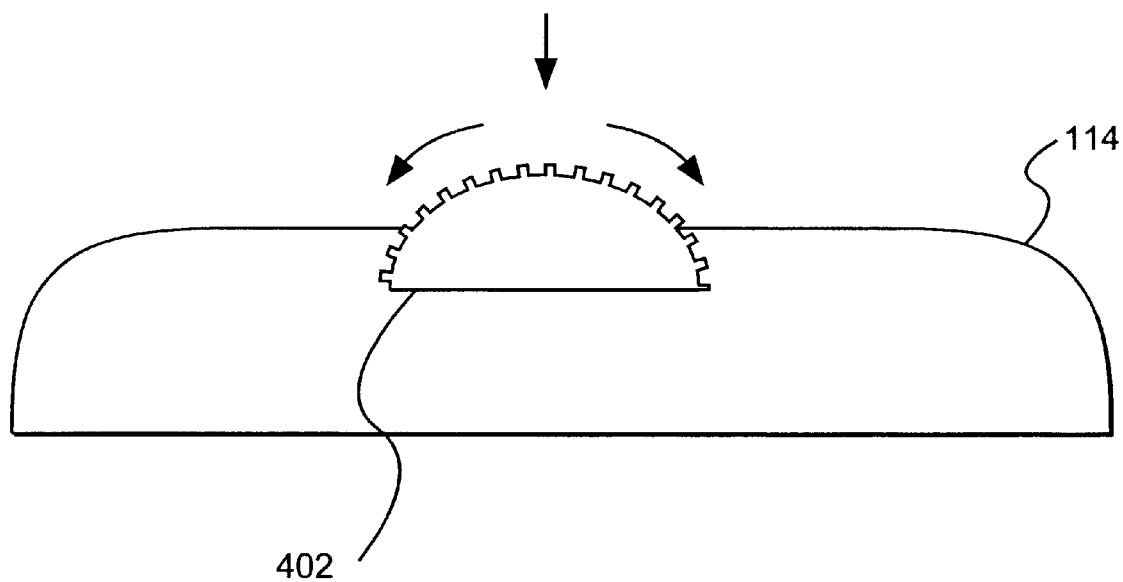

FIG. 4 is a side view of a dial, mounted to palmtop computer 100, constructed according to an exemplary embodiment of the present invention.

Figure 5A:
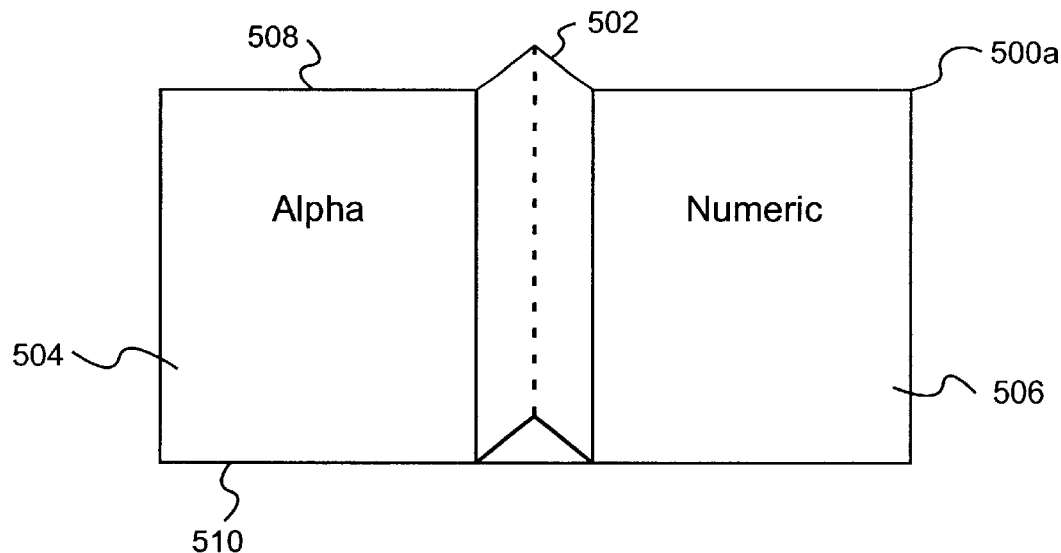
Figure 5B:
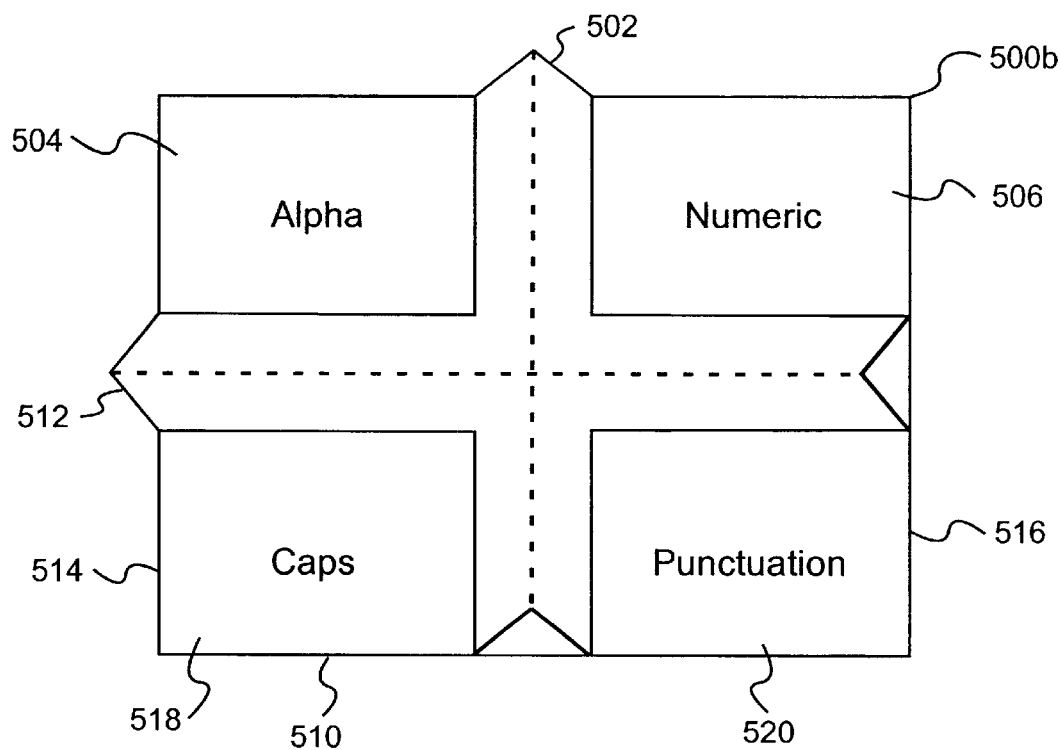

FIGS. 5a and 5b are front views of user input areas 500a and 500b of palmtop computers constructed according to exemplary embodiments of the present invention.

Figure 6A:
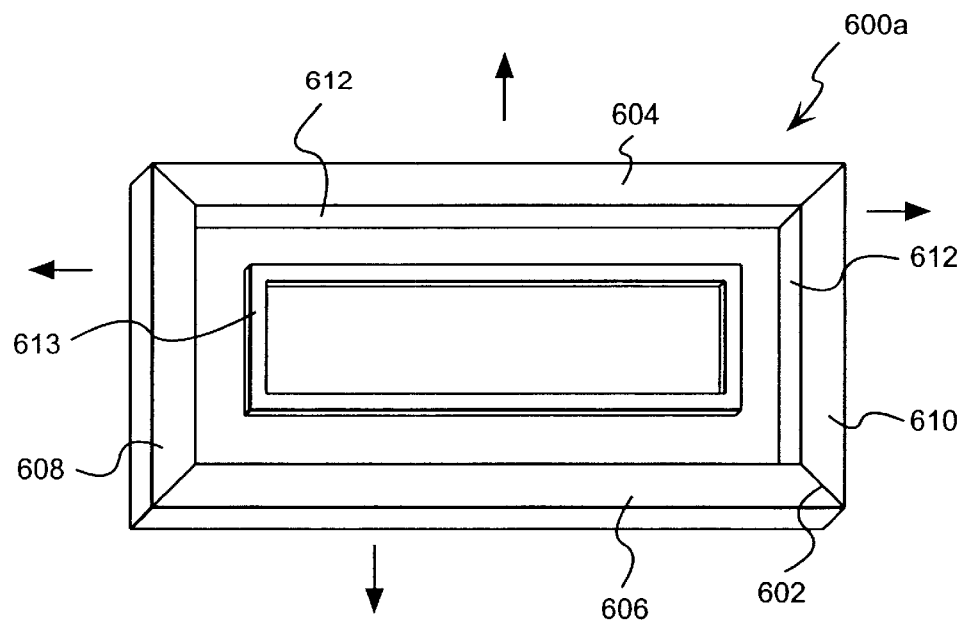
Figure 6B:
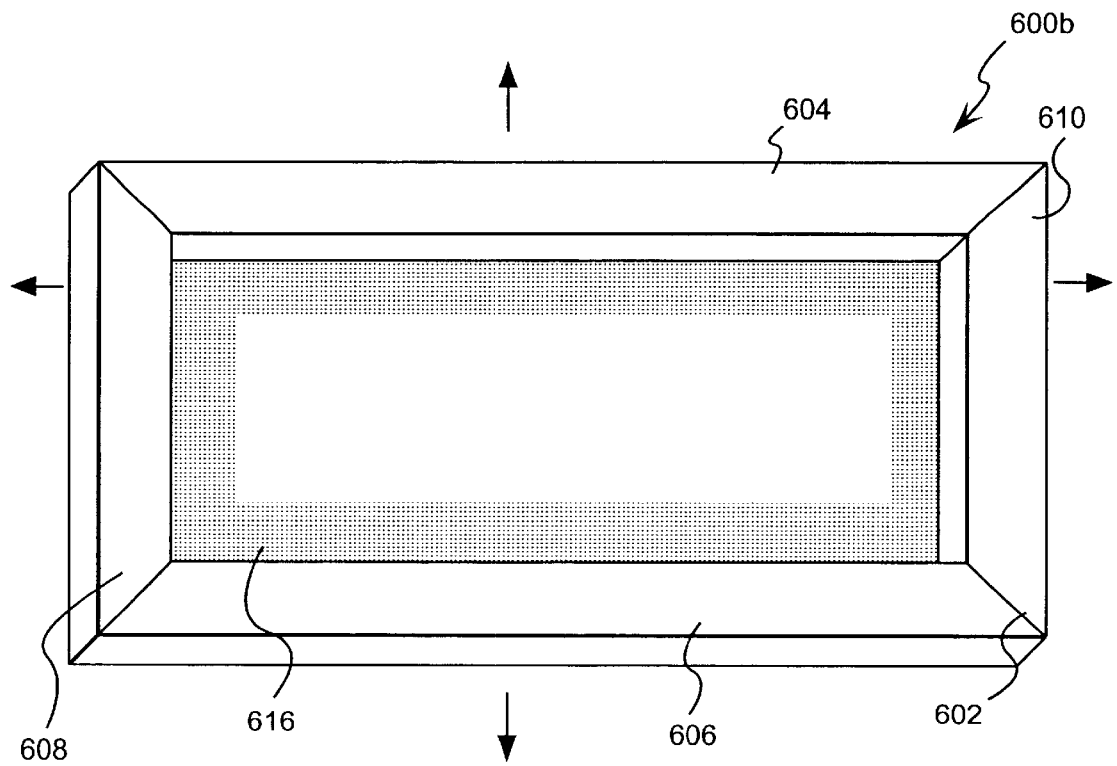
Figure 6C:
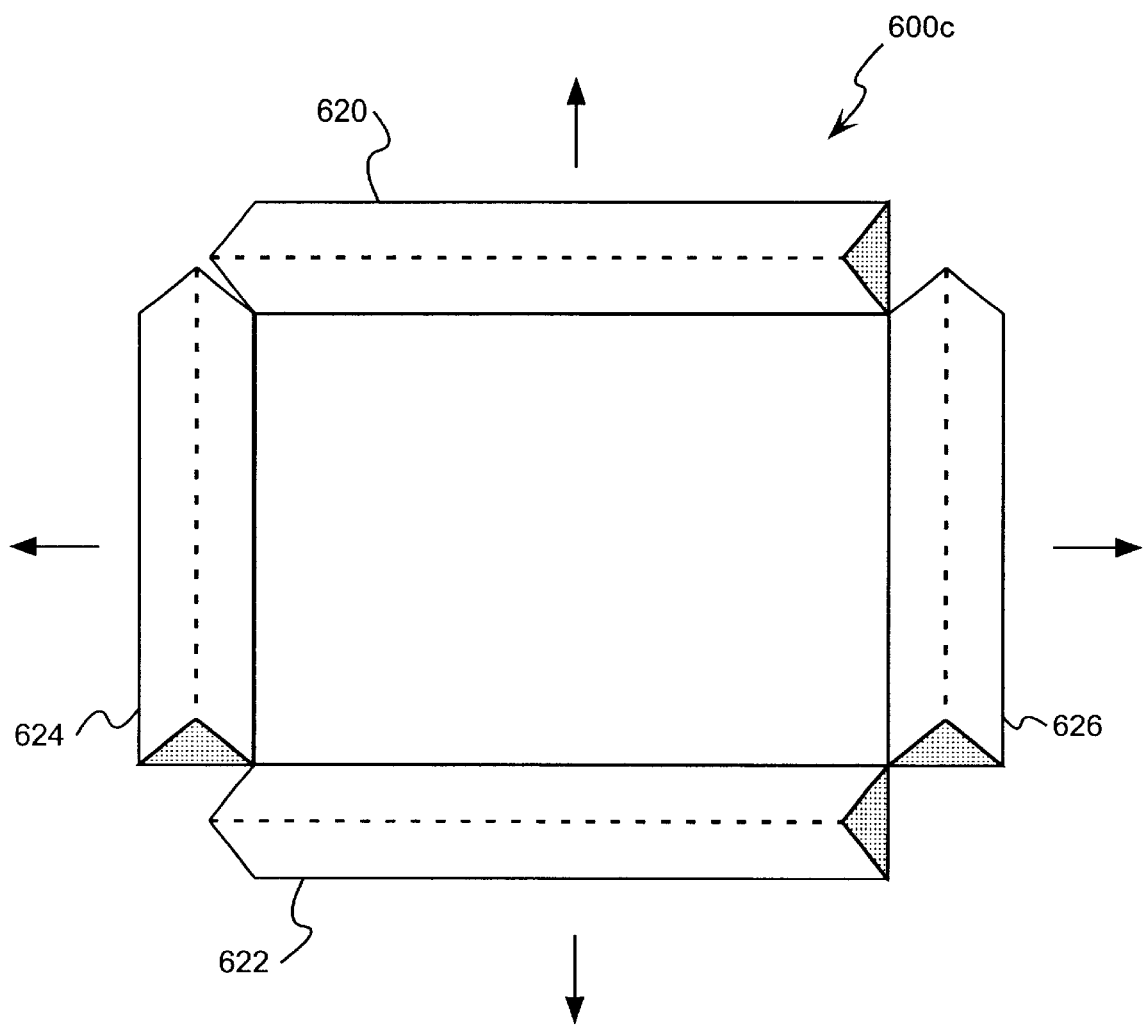

FIGS. 6a, 6b and 6c are front views of user input areas 600a, 600b and 600c of palmtop computers constructed according to exemplary embodiments of the present invention.

Figure 7A:
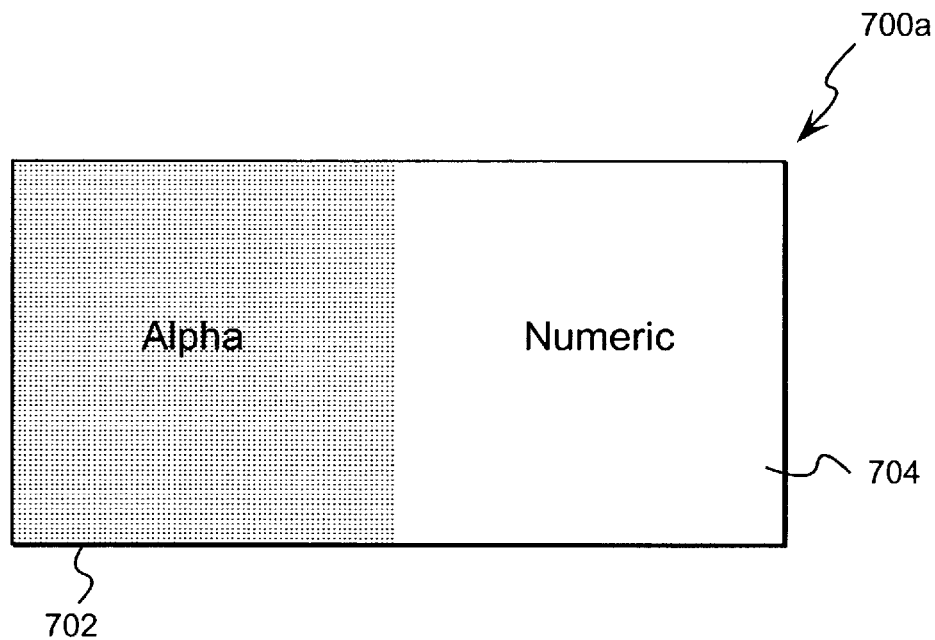
Figure 7B:
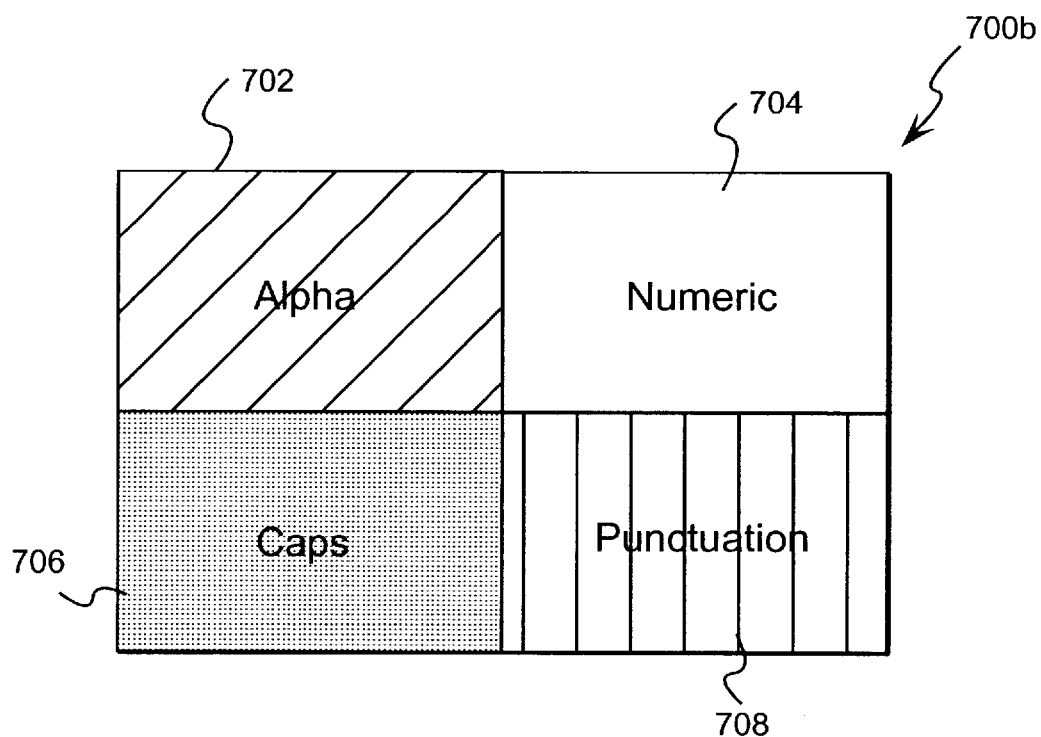

FIGS. 7a and 7b are front views of user input areas 700a and 700b of palmtop computers constructed according to exemplary embodiments of the present invention.

Figure 8A:
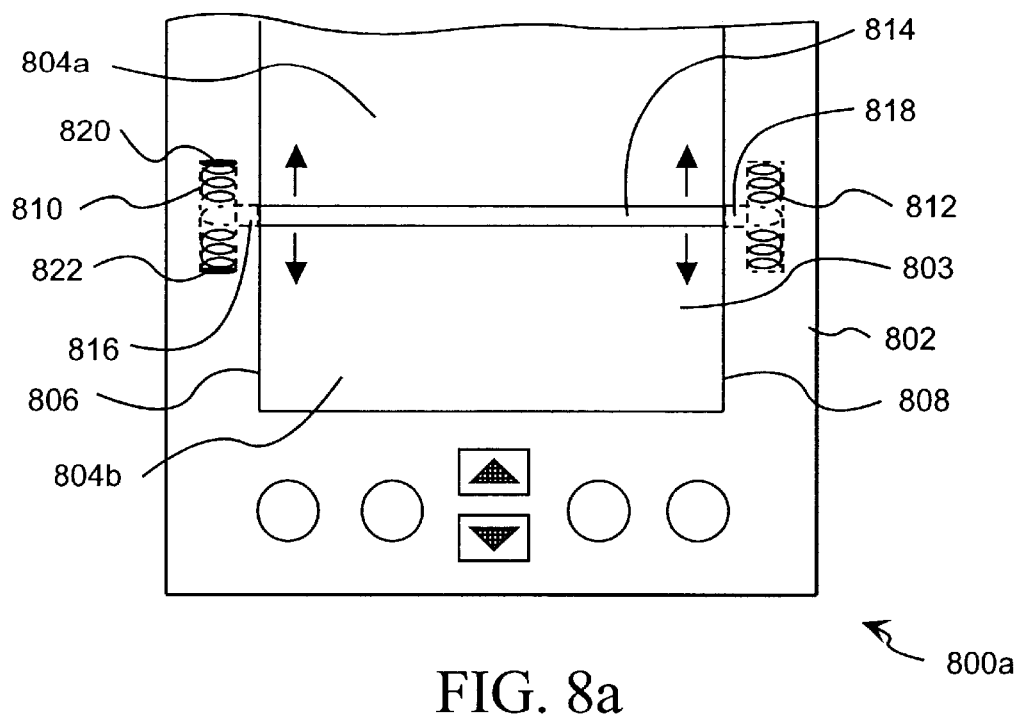
Figure 8B:
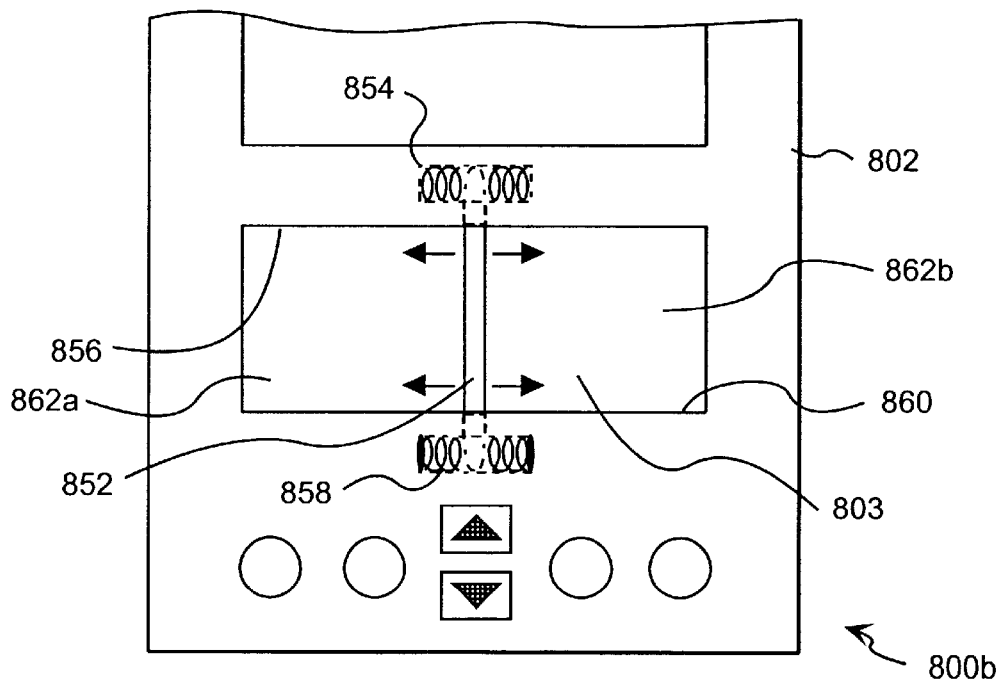

FIGS. 8a and 8b are partial front views of palmtop computers 800a and 800b with moveable bars constructed according to exemplary embodiments of the present invention.

Figure 9:
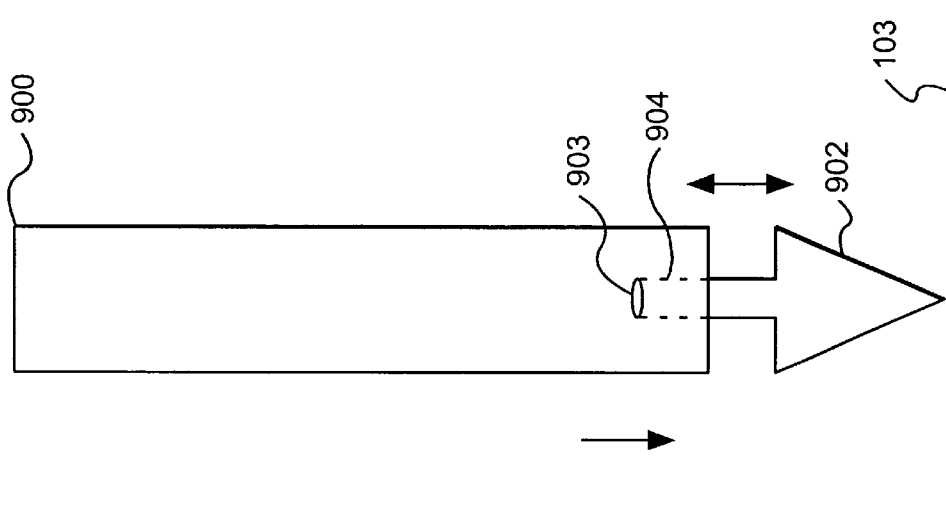

FIG. 9 shows an exemplary pen 900 for use as part of a palmtop computer system constructed according to an exemplary embodiment of the present invention.

Figure 10B:
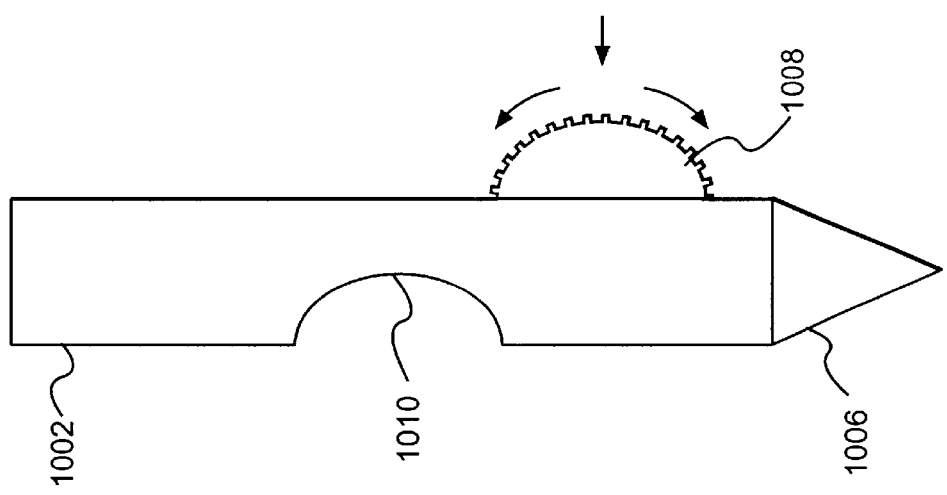
Figure 10A:
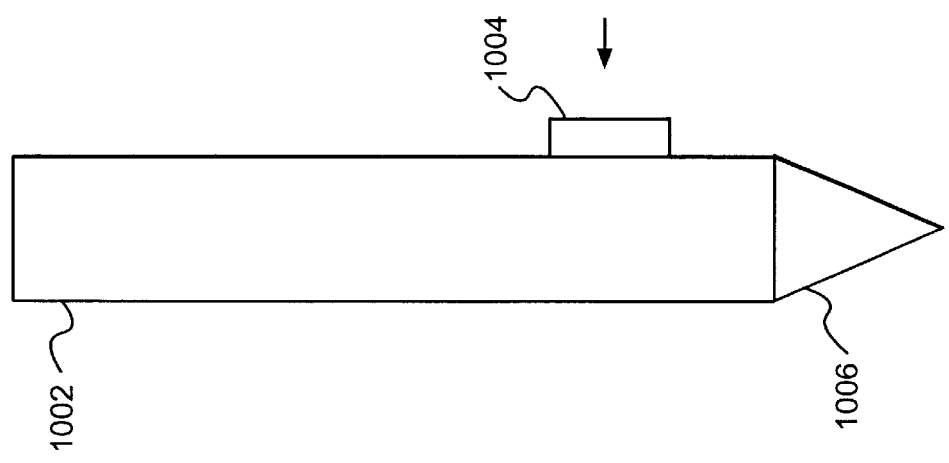

FIGS. 10a and 10b show exemplary pen s 1000a and 1000b for use as part of palmtop computer systems constructed according to exemplary embodiments of the present invention.

DETAILED DESCRIPTION

Figure 1A:
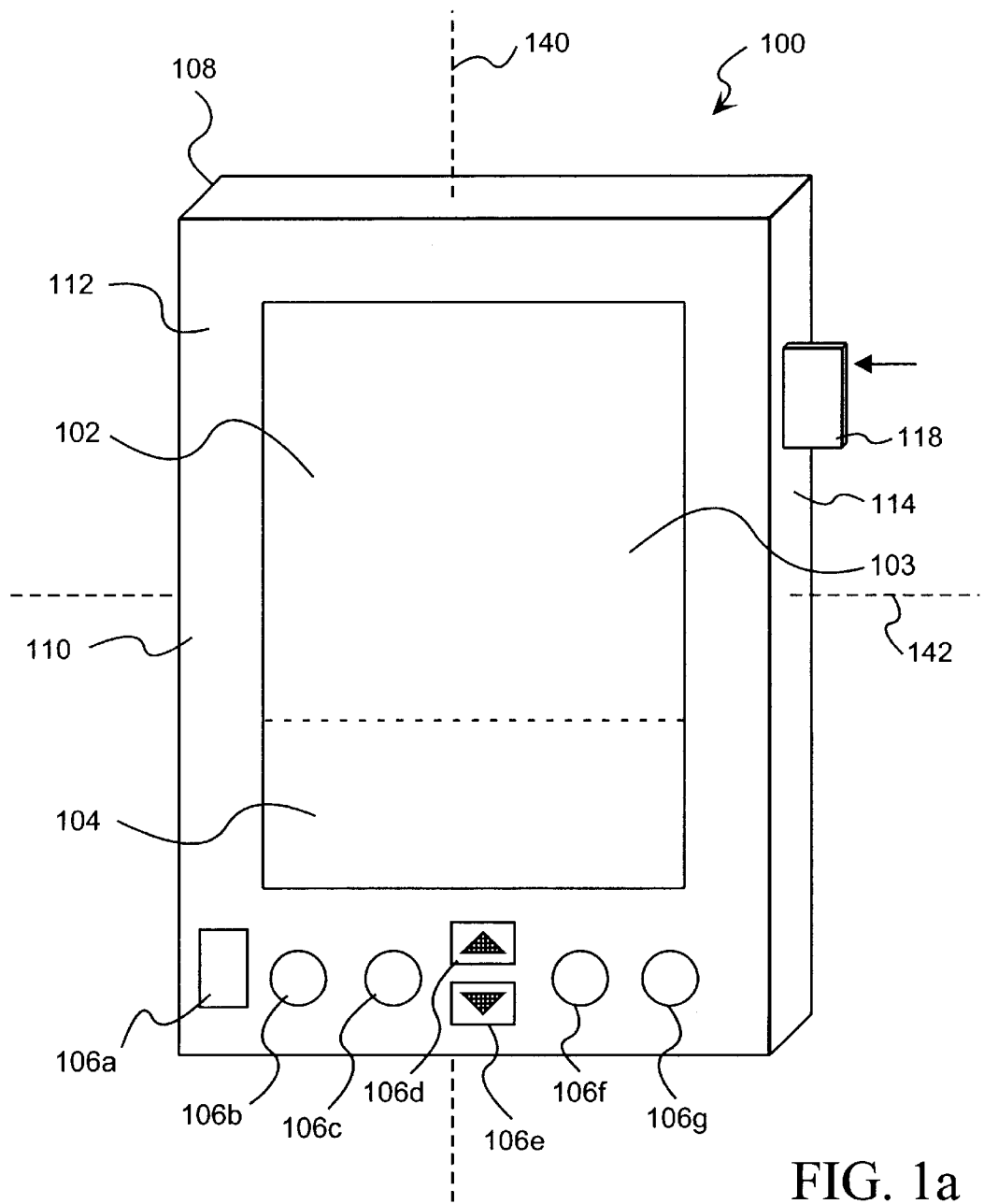
FIG. 1a is a front view of a palmtop computer 100 constructed according to an exemplary embodiment of the present invention.

FIG. 1a shows a palmtop computer 100 which includes a casing 108 made of plastic or any suitable material. Casing 108 has a front panel 110, a left side panel 112, a right side panel 114 and a back panel. Fitted to front panel 110 is a touch sensitive digitizer pad 103 which is capable of detecting presses and movements of a pen or finger. In the embodiment of FIG. 1a, digitizer pad 103 covers a display screen 102 and a user input area 104. Display screen 102 displays information to a user. User input area 104 is used to input text. In one alternative embodiment, digitizer pad 103 covers only user input area 104. In another alternative embodiment, digitizer pad 103 covers a homogenous area which serves as both a display screen and user input area. Other assignments of areas to regions under digitizer pad 103 may be used as should be recognized by those skilled in the art.

In FIG. 1a, palmtop computer 100 includes a plurality of mechanical buttons 106a–106f mounted to front panel 110. Buttons 106a–106f provide the user with various functions for operating palmtop computer 100. In the embodiment of FIG. 1a, button 106a is a power button. Buttons 106d and 106e are bi-directional scrolling buttons used to scroll up and down through information shown on display area 102.

Buttons 106b, 106c, 106f, and 106g are application buttons. In one example, application button 106b is used for a calendar application, application button 106c is used for an address book application, application button 106f is used for a to-do list application, and application button 106g is used for a note pad application. Other applications may be associated with these buttons as will be understood by the skilled artisan. In other exemplary embodiments, buttons 106b, 106c, 106f, and 106g, are generic application buttons which are programmable by the user. Various applications may be assigned to the buttons as designated by the user.

In one example of palmtop computer 100, when palmtop computer 100 is powered off, pressing any one of application buttons 106b, 106c, 106f, and 106g generates a hardware interrupt signal which is sent to a processor within palmtop computer 100. The hardware interrupt signal "wakes" the processor in the palmtop computer 100 from a "sleep" mode and causes the processor to execute code in a "wake-up" routine. In the wake-up routine, the processor checks a register to determine which application button was pressed.

When palmtop computer 100 powers up, the default input mode for inputting text in input area 104 is generally alpha mode, although other modes may be programmed by the user as the default input mode. These include but are not limited to caps mode, numeric mode, and punctuation mode.

Using the Non-Writing Hand

Several exemplary embodiments of the present invention provide for the selection of input modes using the non-writing hand. Some of these embodiments involve one or more physical sensors mounted on the casing of the palmtop computer. The physical sensors are preferably positioned along the sides of the casing to facilitate use by left-handed and right-handed persons. In some embodiments, physical sensors for both types of users are mounted on the same casing. In other embodiments, the physical sensor is positioned for use by either left-handed or right-handed users. For example, in one embodiment, the sensor is mounted on one side of the device for control by one hand, but the user can rotate the device 180 degrees to control the device with the other hand.

In FIG. 1a, a mechanical button 118 is mounted to casing 108 on right panel 114. The button 118 is preferably positioned along the length of right panel 114 proximate the position of the forefinger or middle finger of a right-handed user's left hand when holding the device, to facilitate easy switching between modes. A left-handed user may use the same device and switch modes with the thumb of his right hand. In an alternative embodiment, button 118 is positioned along left panel 112 of casing 108, rather than right panel 114. Such is desirable for the left-handed user who holds palmtop computer 100 with his right hand. The user may then operate button 118 with the forefinger or middle finger of his right hand.

In one exemplary embodiment, button 118 is coupled to the processor within palmtop computer 100. Pressing button 118 sends a signal to the processor instructing the processor to select an input mode. In other exemplary embodiments, software programmed into the processor is used to identify the selection of input modes. In one example, pressing button 118 sends a signal to a register to change one or more status bits representing the particular input mode. Responsive to some external action like lifting the pen, the software checks the status bit and selects the input mode accordingly. In another example, the software simply checks the status bit periodically to determine the input mode. Other implementations for coupling button 118 to select input modes will be recognized by the skilled artisan.

Particular input modes are selected by pressing mechanical button 118. In one embodiment, successively pressing mechanical button 118 causes computer 100 to cycle through the available input modes: caps, numeric, punctuation, alpha, caps, numeric, etc. In another embodiment, specific combinations or sequences of motions cause system 100 to select particular modes. For example, a press and hold selects caps mode, similar to a "CAPS" key on a typewriter. A double press and hold selects numeric mode. When the button is released, the device returns to alpha mode. Other implementations may be used as should be recognized by the skilled artisan.

Figure 1B:
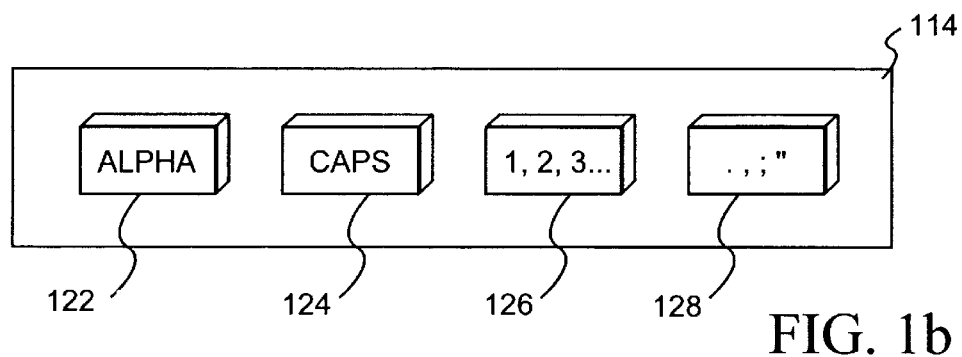
FIG. 1b is a top view of a plurality of mechanical buttons, mounted to palmtop computer 100, constructed according to an exemplary embodiment of the present invention.

FIG. 1b is a top view of a plurality of mechanical buttons 122, 124, 126, 128 which are mounted to palmtop computer 100. The buttons are mounted along side panel 114 of casing 108, preferably proximate the user's fingers when holding the device. Each of the four mechanical buttons is assigned a particular input mode. In one example, button 122 is designated as alpha mode, button 124 is for caps mode, button 126 is for numeric mode, and button 128 is for punctuation mode. Each of the buttons is coupled to select input modes similar to button 118 of FIG. 1*a*. In this way, pressing any one of the buttons switches to the respective input mode assigned to that button.

FIGS. 2*a*–2*c* illustrate another exemplary embodiment of a physical sensor constructed according to the present invention, in the form of a rocker switch 200. The rocker switch is preferably mounted on a side panel 114 or 112 of palmtop computer 100 and positioned along the side panel similar to mechanical button 118. The rocker switch 200 is coupled to select input modes for palmtop computer 100, using techniques described above with respect to FIGS. 1*a* and 1*b*.

In FIG. 2*a*, switch 200 sits in a neutral position 202 when not acted upon by external forces. As shown in FIG. 2*b*, the user may force the switch into an "up" position 204 by rocking the switch in one direction with his finger. As shown in FIG. 2*c*, the user may also force the switch into a "down" position 206 by rocking the switch in the opposite direction. When the user releases rocker switch 200, the switch springs back to neutral position 202 of FIG. 2*a*.

In one exemplary embodiment, alpha mode is selected as the input mode when rocker switch 200 is in neutral position 202. Moving rocker switch 200 to up position 204 changes modes to numeric mode. Rocking the switch 200 down switches to caps input mode. As shown in FIG. 2*a*, rocker switch 200 may also be pressed into panel 114 to define a "pressed" position 208. Pressing switch 200 in this manner selects another input mode, such as punctuation mode. The various switching configurations discussed above for mechanical button 118 are also applicable to rocker switch 200. Various other assignments of input modes to the available positions for rocker switch 200 are possible, as will be recognized by those skilled in the art.

In FIG. 3, another embodiment of a physical sensor for switching among input modes is shown. In particular, palmtop computer 300 includes a first pressure strip 302 mounted along first side panel 304 and a second pressure strip 306 mounted along second side panel 308. The pressure strips 302 and 306 are desirably located along the respective side panels such that one of the pressure strips is positioned under the user's fingers and the other pressure strip is positioned under the user's thumb when gripping the device.

In FIG. 3, the pressure strips 302 and 306 are coupled to select input modes for palmtop computer 300 using hardware and/or software, in similar fashion as described above with respect to the embodiments of FIGS. 1*a*–*b*, and 2*a*–*c*. Preferably, the strips 302 and 306 are coupled such that the computer can detect the activation of both strips, corresponding to the user squeezing the sides of the device with his non-writing hand. In an alternative embodiment, only one pressure strip 302 is mounted on one side panel 304. Pressing the one strip 302, generally while gripping the other side panel 114, selects and switches between input modes.

In FIG. 4, a dial 402 is mounted to side panel 114 of palmtop computer 100. The dial 402 is positioned along the side panel similar to mechanical button 118 of FIG. 1 or rocker switch 200 of FIGS. 2*a* and 2*b*. Dial 402 sits in a neutral position 404 when not acted upon by external forces. The dial is moveable to an "up" position 406 by pressing the switch in one direction, and also to a "down" position 408 by pressing the switch in the opposite direction. When the user releases dial 402, the dial returns to neutral position 202.

FIG. 4 is a side view of a dial 402, mounted to palmtop computer 100, constructed according to an exemplary embodiment of the present invention. Dial 402 is coupled to select input modes for palmtop computer 100 using similar techniques as described above. Dial 402 rests in a neutral position when not acted upon by external forces. Dial 402 may be rotated in one direction to define an "up" position and in the opposite direction to define a "down" position. Preferably, the up and down positions are offset by about 15 degrees from neutral position. One or more springs are preferably incorporate to cause dial 402 to return to neutral position when the user releases the dial.

In FIG. 4, dial 402 is configured, in one example, so that neutral position is associated with alpha mode. Moving dial 402 to the up position changes modes to numeric mode, and moving dial 402 to the down position changes the input mode to caps mode. Similar to rocker switch 200, dial 402 may be pressed into side panel 114 to define a pressed position 410 for switching to another input mode, such as punctuation mode. Various other assignments of particular input modes to the available positions for dial 402 are possible, as will be recognized by those skilled in the art.

Haptic Feedback

In some of the following exemplary embodiments, the input area of the palmtop computer is divided into input mode regions for entering particular kinds of characters. Boundaries between these regions are often delineated by surface textures or ridges, described in more detail below. These boundaries are advantageous as they allow the user to "feel" his way from region to region as he moves a pen or his finger over the input area. The user can thus quickly and easily learn to associate particular input modes with the particular regions so that when using the device, the user will know the region in which he is entering characters without having to look at the device.

There are several variations on the haptic feedback technique. One variation involves ridges which serve as boundaries to differentiate between input mode regions or zones. In one embodiment, shown in FIG. 5*a*, a ridge 502 extends vertically across a user input area 500*a* of a palmtop computer from a top side 508 to a bottom side 510 of input area 500*a*. In this way, ridge 502 defines a first input zone 504 and a second input zone 506. In an alternative embodiment, ridge 502 extends horizontally along input area 500*a* such that input zones 504 and 506 are defined on upper and lower sides of ridge 502. Ridge 502 is preferably molded as part of the digitizer pad of input area 500*a*, although ridge 502 may also be formed separately of some suitable material such as plastic and affixed to the digitizer pad by an adhesive.

In one implementation of input area 500*a* of FIG. 5*a*, first input zone 504 is designated as alpha mode, and second input zone 506 is designated as numeric mode. The palmtop computer is programmed so that the regions of the digitizer pad underlying these input zones recognize characters of only that particular mode. Other designations of particular modes may be defined by the user as desired. In addition, a physical sensor such as mechanical button 118 of FIG. 1 may be incorporated to provide for other modes of input. For example, a user may press mechanical button 118 to switch the designations of input zones 504 and 506 from alpha mode and numeric mode to caps mode and punctuation mode, respectively.

FIG. 5*b* illustrates an input area 500*b*, constructed according to an exemplary embodiment of the present invention, incorporating a second ridge 512 passing across input area 500*b* from a left side 514 to a right side 516. Thus, when second ridge 512 is used in conjunction with ridge 502, four input zones are defined. In one example, zone 504 is for alpha mode, zone 506 is for numeric mode, zone 518 is for caps mode, and zone 520 is for punctuation mode. Other designations may be made, as will be recognized by those skilled in the art.

FIG. 6a illustrates a user input area 600a with a border 602 formed around the input area. The border 602 includes a plurality of ridges 604, 606, 608, 610. A top ridge 604 is positioned along the top of input area 600a, and a bottom ridge 606 lies along the bottom of input area 600a. Left and right ridges 608 and 610 are positioned at the left and right sides of input area 600a, respectively. As shown in FIG. 6a, the ridges 604, 606, 608, 610 have stepped inner edges 612 to provide defined contact points for the user's pen or finger.

In FIG. 6a, each of the ridges is assigned a particular input mode. In one example, upper ridge 604. is assigned caps mode, and lower ridge 606 is assigned alpha mode. Left ridge 608 is assigned numeric mode, and right ridge 610 is assigned punctuation mode. Other assignments of particular modes to the individual ridges may be programmed by the user, as will be recognized by those skilled in the art. The user can then select the desired input mode by touching the appropriate ridge with the user's pen or finger.

In one example of the device shown in FIG. 6a, each ridge is made of a pressure sensitive material and coupled to the processor within the palmtop computer independently of the other ridges. Thus, when the user simply touches a particular ridge with a pen or finger, a signal is communicated from that ridge to the processor to select a particular input mode. Alternatively, the selection may be made using software programmed into the processor, as described above. In this example, the ridges may be connected to one another at their respective ends or moveable independent from one another.

In another example of the device shown in FIG. 6a, each ridge is made of plastic or some similar material and moveable in a direction away from the opposite ridge on the other side of the input area. In this example, the ridges are preferably not connected to one another at their respective ends so the ridges can move independently of one another. Each of the ridges is positioned proximate to a pressure or contact sensor. The contact sensors are independently coupled to the palmtop computer processor. A spring or some other expandable device is preferably situated between each ridge and its associated sensor to separate the two during normal operation. To select an input mode, the user activates the appropriate sensor by touching the associated ridge and pressing it into contact with the sensor.

As shown in FIG. 6a, user input area 600a further includes a relatively smaller inner border 613 formed inside border 602. The inner border 613 may be molded as part of the digitizer pad of input area 600a or formed separately and affixed to the digitizer pad. Inner border 613 is preferably shaped with graded or angled sides similar to ridges 502 and 512 of FIGS. 5a and 5b, as opposed to the stepped inner edges 612 of border 602. The inner border 613 thus provides haptic feedback, as the user feels a slight bump when he drags his pen or finger over the inner border towards border 602. In this way, the user can recognize when he is approaching border 602 and avoid inadvertently touching one of ridges 604, 606, 608, 610 when he does not want to change input modes.

FIG. 6b illustrates another exemplary user input area 600b incorporating border 602 of FIG. 6a for selecting input modes. Border 602 may be realized using the examples described above with respect to FIG. 6a. User input area 600b includes a textured region 616 formed around the input area proximate the ridges that comprise border 602. Textured region 616 provides haptic feedback similar to inner ridge 613. That is, the region provides a warning to the user when he drags his pen or finger close to any of the ridges. The user can recognize when he is approaching border 602 and avoid inadvertently touching one of the ridges to change input modes.

FIG. 6c illustrates yet another exemplary user input area 600c incorporating ridges. In particular, a top ridge 620 is positioned along the top side of input area 600c, and a bottom ridge 622 is positioned along the bottom of input area 600c. Left and right ridges 624 and 626 are positioned at the left and right sides of input area 600c, respectively. Unlike the stepped ridges of FIGS. 6a and 6b, ridges 620, 622, 624, and 626 are shaped with slanted sides similar to ridges 502 and 512 of FIGS. 5a and 5b. The ridges of FIG. 6c are preferably moveable independent of one another. Each of ridges 620, 622, 624, and 626 is assigned a particular input mode and coupled to select the mode in similar fashion to the ridges of FIGS. 6a and 6b.

Other exemplary input areas 700a and 700b of palmtop computers constructed according to the present invention are shown in FIGS. 7a and 7b, respectively. Input regions 700a and 700b have textured zones or regions to provide haptic feedback so the user can easily determine the region in which he is writing without having to look at the palmtop computer.

In FIG. 7a, input area 700a is divided into two input regions, input region 702 and input region 704. The respective regions are demarcated by different textures. In one example, input region 704 has a smooth texture and input region 702 has a relatively rough texture. The palmtop computer is programmed to recognize characters entered in input region 702 as being of one particular mode, and those entered in input region 704 as those of another input mode. In one example, alpha mode is assigned to input region 702, and numeric mode is assigned to input region 704. Other assignments of particular modes to regions 702, 704 may be made as understood by those skilled in the art.

In FIG. 7b, input area 104 is divided into four regions to provide for additional input regions 706 and 708. Caps mode and punctuation mode are assigned to regions 706 and 708, respectively. Each of input regions 702, 704, 706 and 708 has a distinct texture to distinguish that region from the other regions. The surface textures of FIG. 7b provide haptic feedback as to the particular input region in which the user is writing, so the user can be looking at other things than the palmtop computer when entering characters.

FIG. 8a is a partial front view of a palmtop computer 800a constructed according to an exemplary embodiment of the present invention. The palmtop computer includes a casing 802 similar to casing 108 of palmtop computer 100 shown in FIG. 1. Fitted to casing 802 is a digitizer pad 803 having a left side 806 and a right side 808. A left trench 810 is formed in an inner wall of casing 802 proximate left side 806 of digitizer pad 803. The left trench 810 runs parallel to left side 806 of digitizer pad 803. Similarly, a right trench 812 is formed in an inner wall of casing 802 proximate to right side 808 of digitizer pad 803 and runs parallel to right side 808.

In FIG. 8a, a moveable bar 814 is positioned across digitizer pad 803 to define a first input region 804a and a second input region 804b. The palmtop computer 800a is programmed to recognize characters input in region 804a as being of one particular mode such as alpha mode, and characters input in region 804b as of another mode such as caps mode. The bar 814 is made of plastic or any suitably rigid material. In one embodiment, bar 814 is in contact with user the input area, while in other embodiments bar 814 is floating above user input area 804 by the positioning of trenches 810 and 812.

In FIG. 8a, bar 814 has a left end 816 which fits in left trench 810 and a right end 818 which fits in right trench 812. Two springs are situated on either side of left end 816 in left trench 810. Similarly, two springs are situated on either side of right end 818 in right trench 812. A first pressure sensor 820 is positioned in left trench 810 as shown in FIG. 8a, and a second pressure sensor 822 is positioned as shown in FIG. 8a. Each pressure sensor 820, 822 is coupled to select and switch between modes of input using techniques described above.

As the user writes on digitizer pad 803 in input area 804a and input area 804b, he simply pushes bar 814 with his pen or finger in the appropriate direction to select a particular input mode. When the user releases the bar, it springs back to its position as shown in FIG. 8a. In one example, moving bar 814 in the "up" direction to activate pressure sensor 820 selects alpha mode for first input region 804a and caps mode for second input region 804b. Similarly, when bar 814 is pushed in the opposite direction to activate pressure sensor 822, numeric mode is selected for first input region 804a and punctuation mode is selected for second input region 804b. In another example, sensor 820 is used to cycle "up" through a series of input modes with successive presses (e.g., alpha, caps, numeric, punctuation, alpha, etc.), and sensor 822 is for cycling "down" through the input modes (e.g., alpha, punctuation, numeric, caps, alpha, etc.).

FIG. 8b is a partial front view of another palmtop computer 800b constructed according to an exemplary embodiment of the present invention. Palmtop computer 800b is similar to computer 800a of FIG. 8a in most respects although, in FIG. 8b, moveable bar 852 is positioned across digitizer pad 803 substantially perpendicular with respect to bar 814 of FIG. 8a. A top trench 854 is formed in an inner wall of casing 802 proximate a top side 856 of digitizer pad 803. Similarly, a bottom trench 858 is formed in an inner wall of casing 802 proximate to the bottom side 860 of digitizer pad 803.

In FIG. 8b, moveable bar 852 has ends which fit into trenches 854 and 858. By positioning the bar 852 in this manner, a first input region 862a and a second input region 864b of digitizer pad 803 are defined. Input regions 862 and 864 are designated for entering characters using particular modes of input, similar to input regions 804a and 804b of FIG. 8a. Springs and pressure sensors are positioned in trench 858 similar to trench 810 of FIG. 8a for selecting and switching among various input modes.

Pen Pressure

FIG. 9 illustrates an exemplary pen 900 for use as part of a palmtop computer system constructed in accordance with the present invention. The pen 900 includes a retractable tip 902 which is shown in contact with the surface of digitizer pad 103 of the palmtop computer of FIG. 1. A switch 903 is mounted in an inner cavity 904 of pen 900. The switch 903 is in communication with the palmtop computer for selecting and switching among input modes. In one example, communications are supported by a wire coupled between the pen and the palmtop computer. In other examples, wireless communications devices such as RF transmitters and receivers are employed to achieve communications between the pen and palmtop computer.

When pressure is exerted on pen 900 against the surface of digitizer pad 103, as shown in FIG. 9, tip 902 temporarily retracts into inner cavity 904 of pen 900 until the pressure is released. Retraction of tip 902 activates the switch in inner cavity 904, causing a signal to be sent from pen 900 to the palmtop computer. The signal calls for a particular input mode or changes from one input mode to another. Alternatively, the number of presses may signal a particular input mode.

In an alternative embodiment, the magnitude of the pressure exerted on the pen controls which input mode is selected. In one example, a "hard" press signals the palmtop computer to change to caps mode. Two hard presses signals the palmtop computer to change to alpha mode. A relatively light press signifies numeric mode. Preferably, the presses are made by tapping the pen on the casing. In other embodiments, the presses are made while writing, preferably at the beginning of a stroke. In these examples, a pressure sensor is mounted in inner cavity 904 instead of the switch to differentiate between the magnitudes of presses.

Active Pens

In FIG. 10a, a button 1004 is mounted on a pen 1002. Button 1004 is preferably positioned near a writing end 1006 of the pen, as shown in FIG. 10a, such that button 1004 is proximate the user's fingers or thumb when he grips the pen.

Pressing the button toggles a switch inside pen 1002, causing a signal to be sent to the palmtop computer. Communications between the pen and the palmtop computer are established using techniques similar to those described above with respect to FIGS. 9a and 9b. Successive presses of button 1004 cause the computer to cycle through the various input modes, similar to the implementation of mechanical button 118 of FIGS. 1a and 1b. Other assignments of button presses and holds to select and switch input modes such as those described above with respect to other embodiments of the present invention, may be implemented as will be appreciated by the skilled artisan.

In an alternative embodiment, shown in FIG. 10b, a dial 1008 is mounted to the side of pen 1002 in place of button 1004. Rotating the dial causes the palmtop computer to cycle through the various input modes. Pressing dial 1008 selects a particular mode for inputting characters. Other techniques for assigning presses and rotations to select and switch input modes may be implemented as described above, particularly with reference to FIGS. 4, 9a, 9b, and 10a.

Tilt Control

Another exemplary embodiment of a palmtop computer constructed according to the present invention provides for the selection of input modes by tilting the computer in one or more directions. To provide this functionality, one or more accelerometers are preferably incorporated in the palmtop computer. The ADXL202 accelerometer manufactured by Analog Devices is one model which may be used, although other accelerometers may be used as will be appreciated by the skilled artisan.

In one embodiment, one or more ADXL202 accelerometers are mounted to casing 108 of palmtop computer 100 of FIG. 1. The accelerometer may be used in place of button 118. The accelerometer or accelerometers are positioned with respect to a longitudinal Y axis 140 and an X axis 142 substantially perpendicular to the Y axis for two-axis tilt sensing. In this way, for example, tilting the computer 100 in one direction (e.g., clockwise) with respect to Y axis 140 selects one input mode, while tilting the computer 100 in the other direction (e.g., counter-clockwise) with respect to Y axis 140 selects another input mode. Similarly, tilting palmtop computer 100 about X axis 142 in clockwise or counter-clockwise directions selects additional input modes. The inclusion and proper positioning of additional accelerometers allows for the selection of additional input modes by tilting the device with respect to the X, Y and other axes. Various assignments of particular input modes to tilting directions may be made, as will be recognized by the skilled artisan.

The accelerometer or accelerometers are coupled to select input modes using software and/or hardware configurations similar to those described above with respect to other exemplary embodiments of the present invention. Using the ADXL202 accelerometer, digital X and Y output pins are provided which identify the most recent mode selected. These outputs may be coupled directly to the processor within palmtop computer 100 to select and switch input modes. Alternatively, the bits output on the X and Y pins may be clocked and stored as status bits in a register for software-controlled switching.

Audio Feedback

In the exemplary embodiments described above, audio feedback may be used to signal an input mode change to the user. A speaker mounted to the casing of the palmtop computer serves this purpose. The user can turn on or turn off the speaker, depending on the desired operating environment. In one example, a "beep" is emitted through the speaker anytime the input mode changes. In another example, beeps having different frequencies from one another are associated with the various input modes. The user will know which input mode he has selected upon hearing the particular tone associated with that mode. Such audio feedback facilitates the "heads up" nature of palmtop computers constructed according to the present invention, as the user does not need to look at the device during operation to determine what input mode he has selected.

Conclusion

The exemplary embodiments described above reduce the task discontinuities associated with conventional palmtop computers which result from having to use specialized strokes to change input modes. The various techniques for selecting input modes and switching among these modes provides for fast, accurate, and easy entering of characters on a palmtop computer. Also, the techniques described above promote a more "heads up" interaction, as the user does not need to look at the palmtop computer when he wants to change modes. The quality of interaction is improved while maintaining the variety of symbols that can be inputted. Ultimately, the quality of and speed at which documents are produced on handheld devices is improved.

It should be understood that the particular embodiments described above are only illustrative of the principles of the present invention, and various modifications could be made by those skilled in the art without departing from the scope and spirit of the invention. Thus, the scope of the present invention is limited only to the extent of the claims that follow.

What is claimed is:

1. A palmtop computer for receiving input of characters, the computer comprising:
   a casing;
   a digitizer pad coupled to said casing; and,
   a bar mounted with said casing and positioned over said digitizer pad to define a first input region and a second input region, wherein said bar maybe moved to select a character type input mode.

2. The palmtop computer of claim 1, wherein said bar may be moved to select a first input mode for said first region and a second input mode for said second region.

3. The palmtop computer of claim 1, wherein bar may be used to cycle through a plurality of input modes.

4. A palmtop computer for receiving input of characters, the computer comprising:
   a casing;
   a digitizer pad coupled to the casing; and
   a ridge formed on the digitizer pad to define a first input region associated with a first character type input mode and a second input region associated with a second character type input mode.

5. The palmtop computer of claim 4, wherein said first input region includes a first textured region and said second input region includes a second distinct textured region.

6. The palmtop computer of claim 4, further comprising:
   a second ridge formed on the digitizer pad to define, within said first input region, a first sub-region and a second sub-region.

7. The palmtop computer of claim 6, further comprising:
   a third ridge formed on the digitizer pad to define, within said second input region a third sub-region and a fourth sub-region.

8. The palmtop computer of claim 7, wherein each said sub-region is assigned a character type input mode.

9. A palmtop computer for receiving input of characters, the computer comprising:
   a casing;
   a digitizer pad coupled to the casing; and
   a border formed around the digitizer pad, the border including an actuable ridge to select a character type input mode, wherein said actuable ridge includes a stepped inner edge that may be actuated by applying a pressure to said stepped inner edge to select a character type input mode.

10. The palmtop computer of claim 9 wherein the ridge includes a pressure sensitive material.

11. The palmtop computer of claim 9 wherein the ridge may be positioned in a plurality of locations on said digitizer pad.

* * * * *